United States Patent
Klenk et al.

(10) Patent No.: US 6,845,608 B2
(45) Date of Patent: Jan. 25, 2005

(54) METHOD AND DEVICE FOR OPERATING AN INTERNAL COMBUSTION ENGINE USING A PLURALITY OF FUELS

(75) Inventors: Martin Klenk, Backnang (DE); Juergen Gerhardt, Oberriexingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/387,765

(22) Filed: Mar. 12, 2003

(65) Prior Publication Data

US 2003/0226349 A1 Dec. 11, 2003

(30) Foreign Application Priority Data

Mar. 14, 2002 (DE) .......................................... 102 11 122

(51) Int. Cl.⁷ .............................................. F01N 3/00
(52) U.S. Cl. .................... 60/274; 123/1 A; 123/304; 123/575; 60/285
(58) Field of Search .................................. 123/575, 1 A, 123/3, 27 GE, 304, 525, 431; 60/285, 286, 274

(56) References Cited

U.S. PATENT DOCUMENTS

| 6,035,837 A | 3/2000 | Cohen et al. | |
| 6,543,423 B2 * | 4/2003 | Dobryden et al. | 123/480 |
| 6,655,130 B1 * | 12/2003 | Kirwan et al. | 60/284 |

* cited by examiner

Primary Examiner—Tony M. Argenbright
Assistant Examiner—Katrina B. Harris
(74) Attorney, Agent, or Firm—Kenyon & Kenyon

(57) ABSTRACT

A method for operating an internal combustion engine is provided, such as, for example, in a motor vehicle, in which at least two different fuels are simultaneously supplied to at least one combustion chamber of the internal combustion engine.

11 Claims, 5 Drawing Sheets

METHOD AND DEVICE FOR OPERATING AN INTERNAL COMBUSTION ENGINE USING A PLURALITY OF FUELS

FIELD OF THE INVENTION

The present invention relates to a method and a device for operating an internal combustion engine using a plurality of different fuels, for example, in a motor vehicle.

BACKGROUND INFORMATION

In conventional bi-fuel systems, an internal combustion engine may alternatively be operated either with only a first fuel or with only a second fuel.

It may be desirable, such as, for example, in the field of automotive technology, not only to reduce the pollutant emission on the basis of the fuel choice, but also to extend the range of the vehicle on one tank filling. This range may be required to be large enough so as not to limit the mobility of the motor vehicle on the basis of an existing fuel-supply network.

For this purpose, an EXPO™ vehicle of the BMW AG company may be alternatively operated using fuel or pure hydrogen. The switchover between exclusive fuel operation and exclusive hydrogen operation may be implemented by the driver.

In exclusive hydrogen operation, CO2—, CO— and HC-emissions do not occur. Furthermore, the $NO_x$ emission may be greatly reduced. However, the number of service stations providing hydrogen may be few, such as, for example, in rural areas, so that the mobility of the vehicle in exclusive hydrogen operation may be limited as a result. In contrast, in exclusive gasoline operation, the existing comprehensive supply network may be utilized. However, in exclusive gasoline operation, the pollutant emission is considerably higher than in pure hydrogen operation.

U.S. Pat. No. 6,035,837 discusses a bi-fuel injection system for the alternative operation of an internal combustion engine with two fluid fuels. Here, too, the internal combustion engine is required to be operated using either one fuel or the other.

SUMMARY OF THE INVENTION

The present invention provides a method and a device for operating an internal combustion engine that uses a plurality of fuels so that the pollutant emission may be reduced in an operation according to the bi-fuel principle, while the range of the motor vehicle is increased at the same time. Moreover, such a device may be implemented at low cost and in a technically uncomplicated manner.

According to an exemplary method of the present invention, a vehicle may be operated using at least two fuels so that the at least two fuels may be simultaneously supplied to at least one combustion chamber, and in this manner the pollutant emission may be reduced, without requiring any concessions with respect to range.

According to an exemplary method of the present invention, the quantitative ratio of the at least two fuels supplied to the combustion chamber may be modified, so that the respective fuel quantities may be adapted during operation.

According to an exemplary embodiment of the present invention, to reduce the pollutant emission, the quantitative ratio may be determined as a function of at least one characteristic or quantity of the internal combustion engine. For example, a metering of the fuels may be determined as a function of the operating state of the internal combustion engine.

To operate an internal combustion engine having a catalytic converter, the quantitative ratio may be determined as a function of the catalytic-converter temperature so that the proportion of the respective fuels may be adapted to the efficiency of the catalytic converter, which is dependant on its temperature, and thus reduce the pollutant emission.

As the temperature of the catalytic converter increases, the ratio of the quantity of a first fuel supplied to the combustion chamber relative to the quantity of an additional fuel supplied to the combustion chamber may be reduced by a specifiable value that is proportional to the catalytic-converter temperature. Experiments show that the pollutant emission is drastically lowered at the start of the internal combustion engine with a cold catalytic converter when metering a large proportion of the fuel that results in a lower pollutant emission.

The metering of this fuel may be reduced with the warming-up of the catalytic converter and, while simultaneously increasing the additional fuel proportion, the use of the first fuel may be reduced, thus increasing the range of the motor vehicle.

Since it is understood that hydrogen combustion generates low $NO_X$ emissions, without CO2—, CO— and HC-emissions, it may be desirable to supply hydrogen to the combustion chamber as the first fuel. Moreover, if gasoline or diesel fuel is used as an additional fuel supply, problems may not occur since these fuels may be widely available. Therefore, combining one of these fuels with hydrogen may be suitable for operating motor vehicles that have an internal combustion engine, thereby obtaining low pollutant emissions and, simultaneously, a long range.

It is understood that a wall film is not produced when pure hydrogen is injected into the combustion chamber, as may be the case, for instance, in fuel injection. The wall film may inhibit an oil film from forming, thereby endangering the contact surfaces in the combustion chamber and reducing the service life of the piston and/or the cylinder in comparison to pure hydrogen operation.

A further exemplary method provides for supplying the catalytic converter with specifiable quantities of a hydrogen-air mixture. Comprehensive testing shows that supplying hydrogen to the catalytic converter leads to a drastic shortening of the warm-up phase of the catalytic converter, which results in a rapid increase of its efficiency and a lowering of the pollutant emission.

An exemplary device for implementing the exemplary method according to the present invention provides at least one fuel-metering device for the simultaneous metering of at least two fuels, including a control unit for the separate control of quantities of the at least two fuels, an arrangement for detecting at least one characteristic or quantity of the internal combustion engine and an arrangement for determining the quantities of the at least two fuels from the at least one characteristic or quantity. In this manner, the quantity of each of the two fuels, for instance, hydrogen and gasoline or diesel fuel, may be metered as a function of the operating state of the internal combustion engine. Thus, both a reduction in the pollutant emissions and a reduction in the fuel consumption may be achieved, which results in a lower pollutant emission and an increased range of the motor vehicle.

Since the efficiency, and thus also the pollutant emission, may change with the temperature of the catalytic converter, at least one arrangement for ascertaining the at least one characteristic or quantity may be provided, for example, as at least one temperature sensor positioned at the catalytic converter. In this manner, the temperature of the catalytic converter may be detected with sufficient precision and low technical effort.

The supply of hydrogen may be implemented in a variety of ways.

In a first exemplary embodiment, the hydrogen supply is connected to a hydrogen tank. This exemplary embodiment may be desirable for larger motor vehicles where sufficient space is available for a hydrogen tank. An acceptable size in this context may be provided by hydrogen pressure reservoirs with a storage capacity that is large enough not to limit the range of the motor vehicle. Moreover, hydrogen tanks are easy to refuel.

Another exemplary embodiment is provided for use in vehicles that have limited installation room. A hydrogen tank may be dispensed with in this case, since at least a first of the fuel supply lines may be alternatively connected to a reformer, this reformer being able to convert fuel into hydrogen and the fuel being supplied by at least one additional fuel supply line. In turn, the reformer is connected to at least one additional fuel supply line. In this context, the hydrogen may be produced from an additional fuel, such as diesel fuel or gasoline, which may be present anyway.

To increase the efficiency of the catalytic converter as quickly as possible, at least one separate hydrogen-supply line having at least one dosing valve may be arranged between a hydrogen-supply line and the catalytic converter, to meter a hydrogen quantity. The catalytic converter may thereby be supplied with hydrogen, which may be present in the motor vehicle anyway, in a technically uncomplicated manner.

DETAILED DESCRIPTION

Figure 1A:
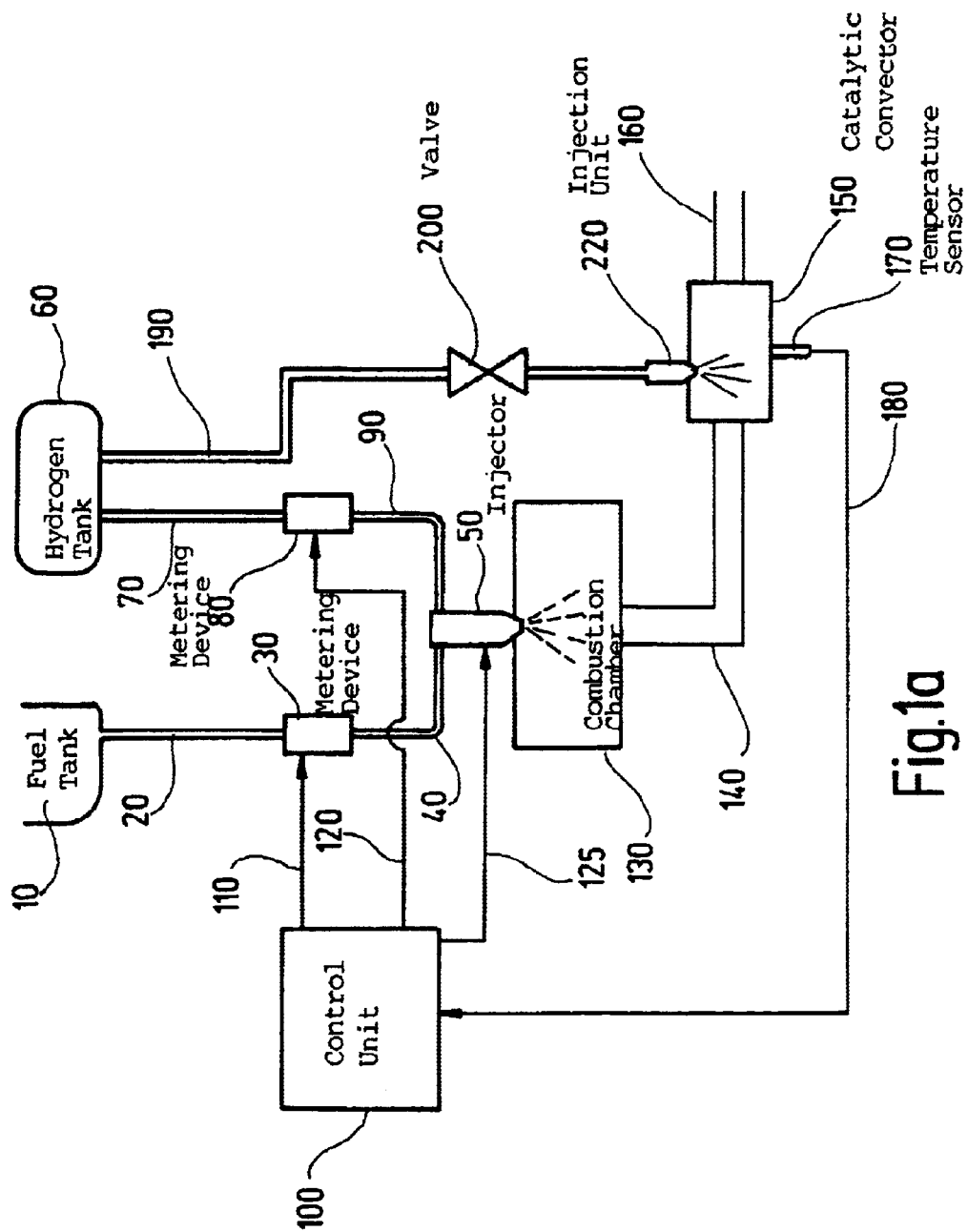
FIG. 1a shows schematic illustration of a device according to the present invention for simultaneously operating an internal combustion engine with hydrogen from a hydrogen tank and an additional fuel, using a shared injector.

An internal combustion engine shown in FIG. 1a may be operated using hydrogen and an additional fuel.

From a tank 10, the additional fuel, such as gasoline or diesel fuel, is supplied via a fuel-supply line 20 of a fuel-quantity metering device 30. The fuel quantity determined therein is supplied to an injector 50 via an additional fuel-supply line 40.

Simultaneously, hydrogen from a hydrogen tank 60, such as a hydrogen-pressure tank, is supplied to a hydrogen-metering device 80 via a hydrogen-supply line 70, and the hydrogen quantity metered therein is supplied, via a further hydrogen supply line 90, to injector 50, where the additional fuel is mixed with the hydrogen quantity.

Instead of a hydrogen tank, some other device suitable for storing and/or supplying hydrogen may be used as well.

The control of both fuel-metering device 30, hydrogen-metering device 80, and the control of injector 50 is implemented by a control unit 100, via lines 110, 120 and 125.

The hydrogen-fuel mixture thus produced is supplied to a combustion chamber 130 of the internal combustion engine, via injector 50.

The waste gases produced in combustion chamber 130 by the combustion, are forwarded, via an exhaust pipe 140, to a catalytic converter 150, in which a conventional purification of the exhaust gas may be performed. The purified exhaust gases may be carried away via an additional exhaust pipe 160.

At least one temperature sensor 170 is provided in catalytic converter 150. Via a line 180, a measuring value representing the temperature is forwarded to control unit 100.

In control unit 100, a quantitative ratio of hydrogen and the additional fuel is specified, taking into account the temperature of catalytic converter 150, and the hydrogen quantities or fuel quantities corresponding to this quantitative ratio are supplied to injector 50 via quantity-metering devices 30 and 80.

Moreover, via a further hydrogen line 190 having a dosing valve 200, hydrogen is supplied to an injection unit 220. In a conventional manner, this hydrogen is mixed with air (not shown) and supplied directly to catalytic converter 150.

This allows catalytic converter 150 to more rapidly reach its operating temperature at which it is highly efficient with respect to waste-gas purification.

Instead of being connected to hydrogen tank 60, additional hydrogen line 190 may also be connected to hydrogen line 70.

Figure 1B:
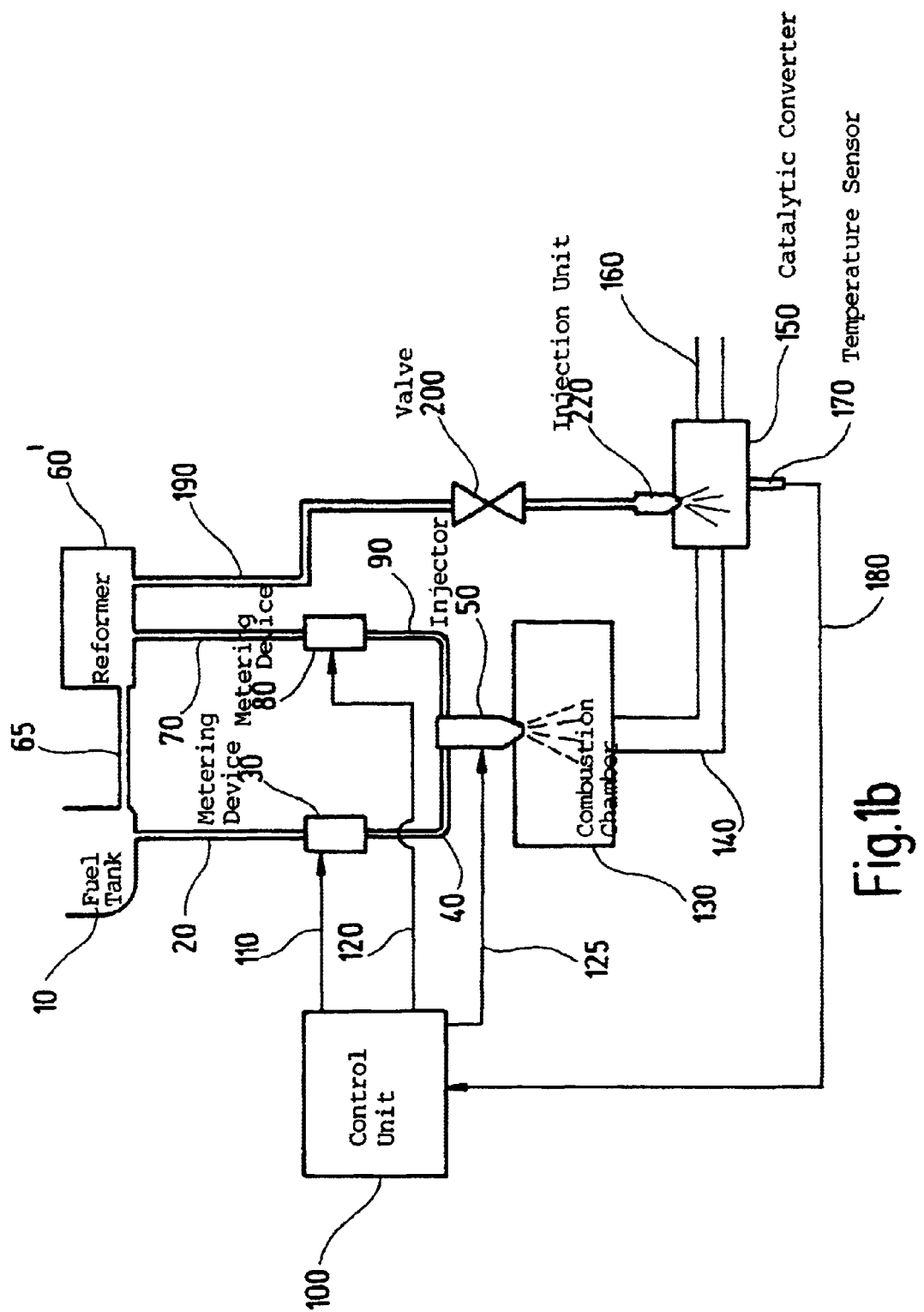
FIG. 1b shows an alternative exemplary embodiment to that shown in FIG. 1a, which is provided with a reformer instead of the hydrogen tank.

In a second exemplary embodiment, shown in FIG. 1b, the elements that are identical to those of the first exemplary embodiment described in FIG. 1a, are provided with identical reference numerals, so that, with respect to their description, full reference is made to the entire contents of the explanations for the first exemplary embodiment.

This second exemplary embodiment differs from the first, represented in FIG. 1a, in that a reformer 60' is provided instead of hydrogen tank 60, which is supplied with the additional fuel from tank 10 via a fuel line 65. Fuel line 65 may also be connected to fuel line 20. Hydrogen is produced from the additional fuel with the aid of reformer 60'.

Figure 1C:
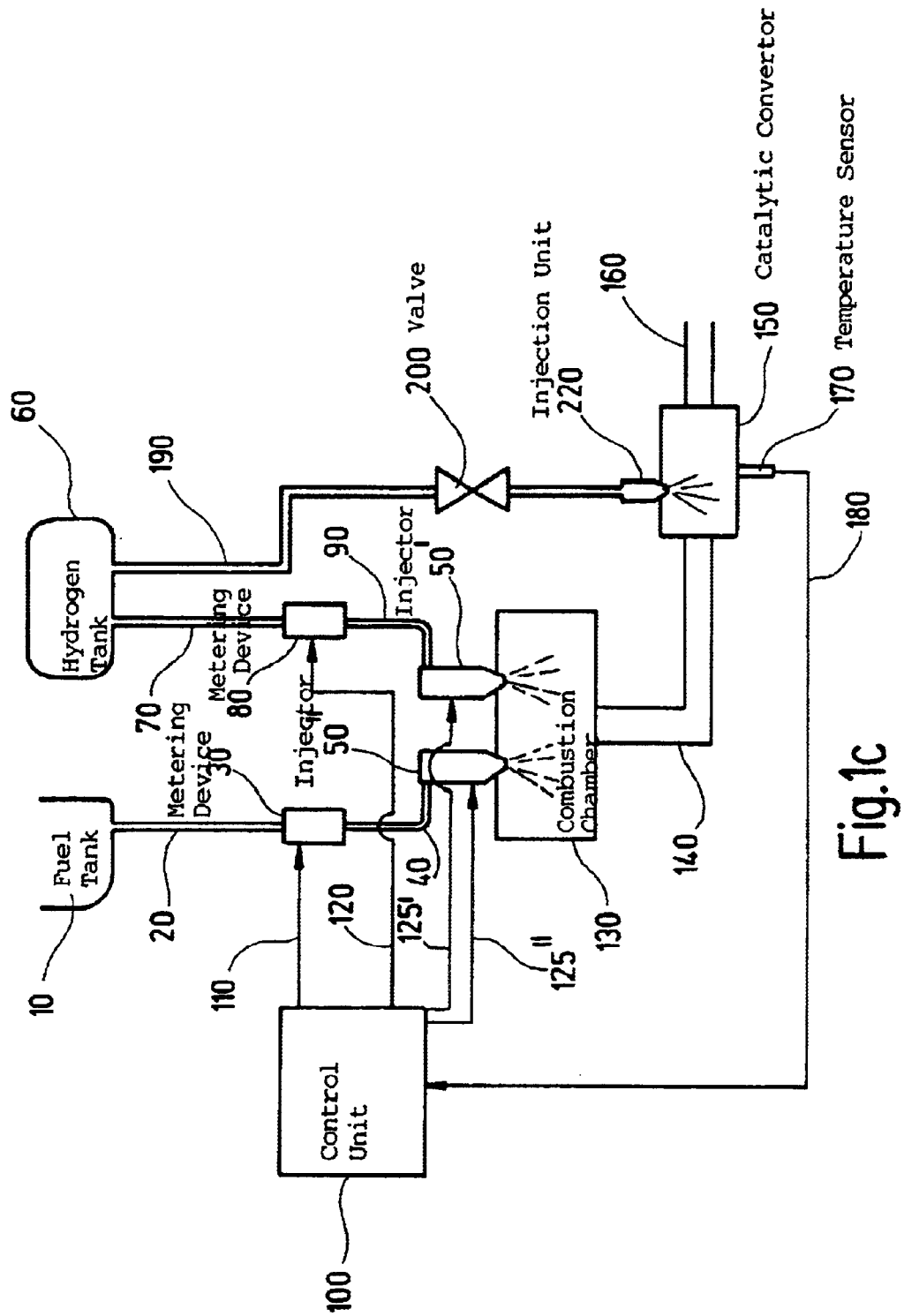
FIG. 1c shows a further alternative exemplary embodiment to that shown in FIG. 1a, having two separate injectors for hydrogen and the additional fuel.

FIG. 1c shows a third alternative exemplary embodiment in which the elements that are identical to those of the first exemplary embodiment described in FIG. 1a, are provided with identical reference numerals, so that, with respect to their description, reference is made to the entire contents of the explanations for the first exemplary embodiment. This third exemplary embodiment differs from the first, shown in FIG. 1a, merely in that two separate injectors, 50' for hydrogen and 50" for the additional fuel, are provided instead of only one common injector 50. Injector 50" is connected to fuel line 40 and activated via line 125". Injector 50', on the other hand, is connected to hydrogen line 90 and is activated via line 125'. Line 125 is omitted in the exemplary embodiment shown.

Injectors 50' and 50" may be in separate locations, but may also constitute part of a common sub-assembly, it being required here that the fuels are not mixed in the injectors but, for instance, in the combustion chamber.

Figure 1D:
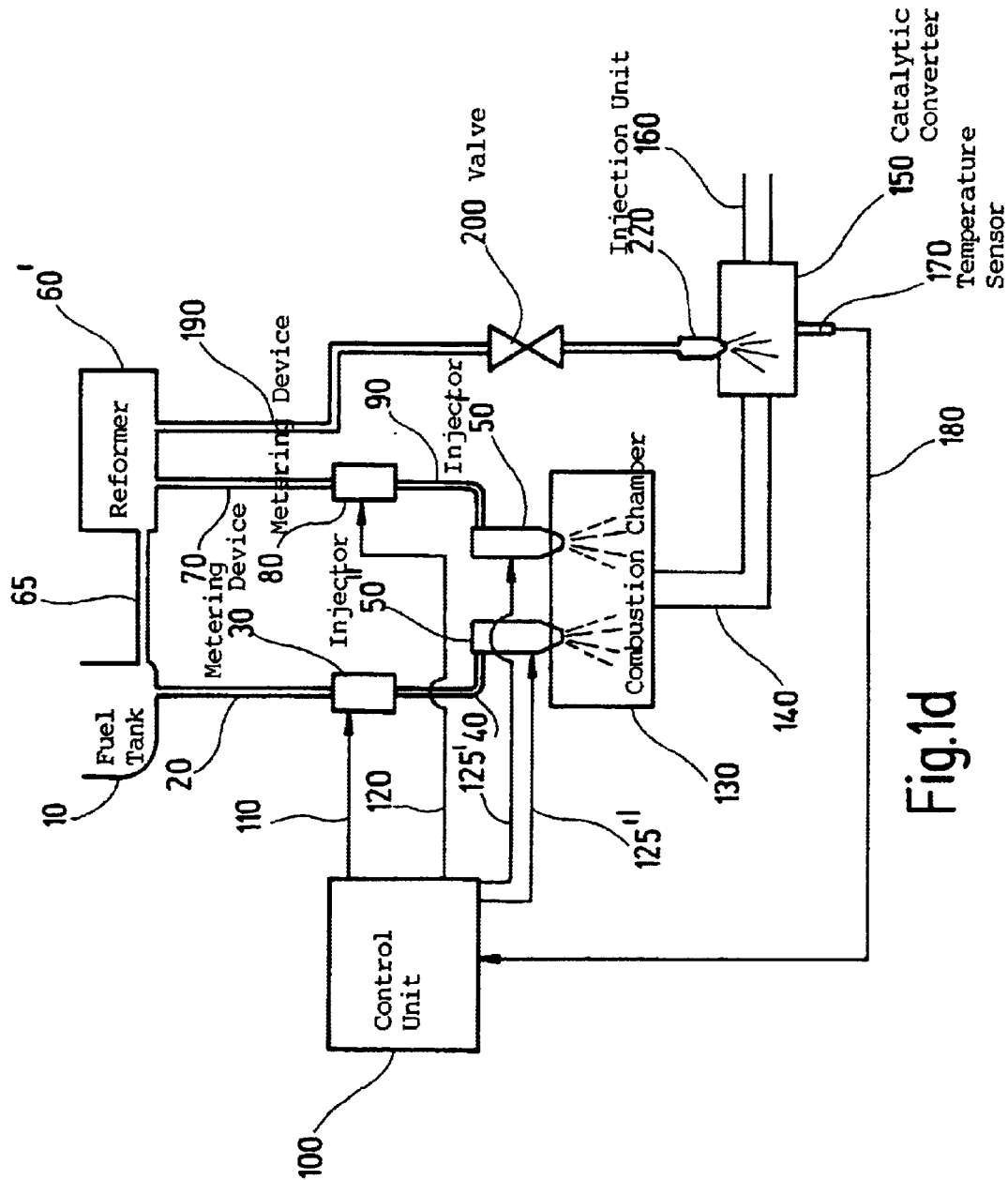
FIG. 1d shows an alternative exemplary embodiment to that shown in FIG. 1c, which is provided with a reformer instead of the hydrogen tank.

A fourth alternative exemplary embodiment is shown in FIG. 1d. Those elements identical to the third exemplary embodiment described in FIG. 1c, are again provided with identical reference numerals so that, with respect to their description, full reference is made to the explanations for the third exemplary embodiment represented in FIG. 1c. This fourth exemplary embodiment differs from the third, represented in FIG. 1c, merely in that reformer 60', just as in the second exemplary embodiment according to FIG. 1b, is provided with fuel line 65 instead of hydrogen tank 60.

The arrangement of the device components in the exemplary embodiments according to FIGS. 1a to 1d is to be understood as an example. For instance, fuel-quantity metering devices 30 and 80, together with injectors 50 or 50', may make up a fuel-metering unit in a common housing. Control unit 100 may also be part of this fuel-metering device.

Figure 2:
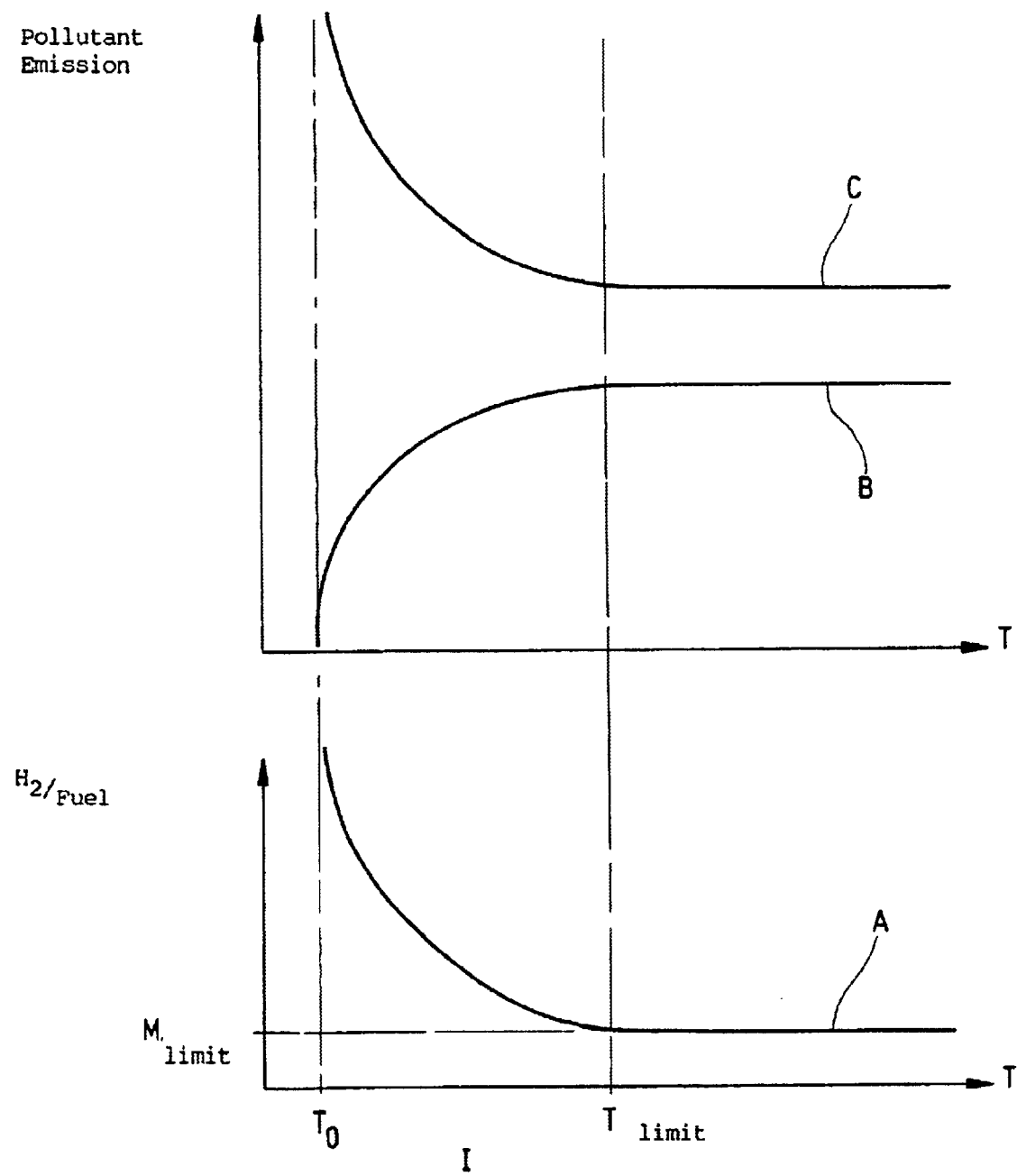
FIG. 2 shows the quantitative ratio of hydrogen to the additional fuel, above the catalytic-converter temperature, and the characteristic curve of the pollutant emission compared to the operation using only the additional fuel.

Curve A in FIG. 2 represents the quantitative ratio of hydrogen to the additional fuel (H2/fuel) as a function of catalytic-converter temperature T during the implementation of a method in accordance with the present invention. In curve B, the characteristic curve of the pollutant-emission quantity is shown as a function of catalytic-converter temperature T when only the additional fuel is used in the operation.

The abscissa scale on which curves A, B and C are based is the same. The ordinate scale of curve B and C is likewise identical. However, the ordinate scale of curve A differs therefrom.

It is to be understood that both the profile of the curves as well as the scales are merely intended to illustrate the interrelationship by way of example, so that, in principle, other curve profiles are possible as well.

Given a low catalytic-converter temperature, initially, i.e. at $T_o$, pure hydrogen is supplied to combustion chamber 130 of the internal combustion engine at a temperature interval I, which is limited by temperature $T_o$ and $T_{limit}$. Since hydrogen combustion causes minimal pollutant emission, at the beginning of the method this emission is low, for as long as the catalytic-converter temperature is within temperature interval I, as sketched with the aid of the profile of curve B.

With increasing catalytic-converter temperature, the hydrogen proportion is reduced within temperature interval I until, at a limiting temperature $T_{limit}$ of catalytic converter 150, at which it has reached its optimum efficiency, the quantitative ratio of hydrogen is set to a value $M_{limit}$ with respect to the additional fuel. This has the result that, although the pollutant emission, according to curve B, is low when compared to the operation with the additional fuel alone, according to curve C, the hydrogen consumption is reduced as well, in such a manner that the motor vehicle may achieve a sufficient distance range of 500 km, for example, without additional refueling of fuel and/or hydrogen being required.

If the catalytic-converter temperature exceeds limiting temperature $T_{limit}$, the pollutant emission according to curve B assumes a value that is below a value in an operation using only the additional fuel, which is represented in curve C by way of example.

What is claimed is:

1. A method for operating an internal combustion engine using at least two different fuels, comprising:

simultaneously supplying the at least two different fuels to at least one combustion chamber of the internal combustion engine; and altering a quantitative ratio of the at least two fuels supplied to the at least one combustion chamber;

wherein the quantitative ratio is determined as a function of a catalytic-converter temperature of a catalytic converter of the internal combustion engine.

2. The method according to claim 1, further comprising:

reducing a ratio of a quantity of a first fuel supplied to the at least one combustion chamber with respect to a quantity of an additional fuel supplied to the at least one combustion chamber, by a specified value that is proportional to an increasing catalytic-converter temperature.

3. The method according to claim 2, wherein the first fuel is hydrogen and the additional fuel is a liquid fuel.

4. The method according to claim 3, wherein the liquid fuel includes one of gasoline and diesel fuel.

5. The method according to claim 1, further comprising:

supplying a specified quantity of a hydrogen-air mixture to a catalytic converter.

6. A device for operating an internal combustion engine including a combustion chamber and an exhaust system having a catalytic converter, using at least two different fuels, comprising:

at least two fuel supply lines for supplying the at least two different fuels to the combustion chamber;

at least one fuel-metering unit arranged between the at least two fuel supply lines and including at least one fuel-quantity metering device for simultaneously metering the at least two different fuels;

a control unit for separately controlling quantities of the at least two different fuels;

an arrangement for ascertaining at least one characteristic quantity of the internal combustion engine; and an arrangement for determining the quantities of the at least two fuels from the at least one characteristic quantity;

wherein the at least one characteristic quantity includes a catalytic-converter temperature of a catalytic converter of the internal combustion engine.

7. The device according to claim 6, wherein the arrangement for ascertaining the at least one characteristic quantity includes at least one temperature sensor arranged at the catalytic converter.

8. The device according to claim 6, further comprising:

a hydrogen tank connected to at least one of the at least two fuel supply lines.

9. The device according to claim 8, further comprising:

a hydrogen pressure reservoir connected to at least one of the at least two fuel supply lines.

10. The device according to claim 6, further comprising:

a reformer for converting fuel into hydrogen, wherein the at least two fuel supply lines include a first fuel supply line connected to the reformer.

11. The device as recited in claim 8, wherein the at least two fuel supply lines include at least one hydrogen line having at least one dosing valve arranged between the hydrogen tank and the catalytic converter to meter a hydrogen-air mixture.

\* \* \* \* \*